US009426126B2

(12) United States Patent
Murphy et al.

(10) Patent No.: US 9,426,126 B2
(45) Date of Patent: *Aug. 23, 2016

(54) METHOD AND SYSTEM FOR AUTOMATIC GENERATION OF CONTEXT-AWARE COVER MESSAGE

(71) Applicant: Private Giant, Orlando, FL (US)

(72) Inventors: Shaun Murphy, Orlando, FL (US); Charles Murphy, Sarasota, FL (US); Richard Johnson, Briarcliff Manor, NY (US)

(73) Assignee: PRIVATE GIANT, Orlando, FL (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/576,010

(22) Filed: Dec. 18, 2014

(65) Prior Publication Data
US 2015/0156177 A1 Jun. 4, 2015

Related U.S. Application Data

(63) Continuation of application No. 13/906,039, filed on May 30, 2013, now Pat. No. 8,918,896.

(60) Provisional application No. 61/655,434, filed on Jun. 4, 2012.

(51) Int. Cl.
*H04L 29/06* (2006.01)
*H04L 12/58* (2006.01)

(52) U.S. Cl.
CPC ............ *H04L 63/0407* (2013.01); *H04L 51/18* (2013.01); *H04L 51/24* (2013.01); *H04L 63/04* (2013.01); *H04L 63/0428* (2013.01); *H04L 63/0442* (2013.01); *H04L 63/12* (2013.01);
(Continued)

(58) Field of Classification Search
CPC .................................................. H04L 63/0407
See application file for complete search history.

(56) References Cited

U.S. PATENT DOCUMENTS

| 5,425,102 A | 6/1995 | Moy |
| 7,124,167 B1 | 10/2006 | Bellotti et al. |
| 7,325,127 B2 | 1/2008 | Olkin et al. |

(Continued)

OTHER PUBLICATIONS

Yahalom et al.; Trust relationships in secure systems—a distributed authentication perspective; Published in: Research in Security and Privacy, 1993. Proceedings., 1993 IEEE Computer Society Symposium on; Date of Conference: May 24-26, 1993; pp. 150-164; IEEE Xplore.*

(Continued)

*Primary Examiner* — Bradley Holder
(74) *Attorney, Agent, or Firm* — Shun Yao; Park, Vaughan, Fleming & Dowler LLP

(57) ABSTRACT

One embodiment provides a system that facilitates secure communication between a sending device and a receiving device. During operation, the system receives, at the receiving device, a benign message sent over a communication channel from the sending device. Next, the system computes a digest from the benign message by hashing the benign message. The system then queries a cover message server with the computed digest to determine whether the benign message indicates that an encrypted message is available at a secure message server. Subsequently, the system obtains the encrypted message from the secure message server, responsive to determining that the benign message indicates that the encrypted message is available at the secure message server.

18 Claims, 7 Drawing Sheets

(52) U.S. Cl.
CPC ........... *H04L 63/083* (2013.01); *H04L 63/1475* (2013.01); *H04L 63/168* (2013.01)

(56) References Cited

U.S. PATENT DOCUMENTS

| | | | | |
|---|---|---|---|---|
| 7,502,754 | B2* | 3/2009 | Campbell | G06Q 30/04 380/255 |
| 7,568,219 | B2* | 7/2009 | Campbell | G06Q 30/04 726/4 |
| 7,584,277 | B2* | 9/2009 | Campbell | G06Q 30/04 709/219 |
| 8,122,490 | B2* | 2/2012 | Campbell | G06Q 30/04 726/4 |
| 8,607,326 | B2* | 12/2013 | Brown | H04L 12/5895 713/153 |
| 2001/0037453 | A1* | 11/2001 | Mitty | H04L 51/30 713/168 |
| 2003/0046533 | A1 | 3/2003 | Olkin | |
| 2003/0172122 | A1* | 9/2003 | Little | H04L 12/5875 709/207 |
| 2004/0025057 | A1* | 2/2004 | Cook | G06Q 10/107 726/28 |
| 2005/0066194 | A1* | 3/2005 | Campbell | G06Q 30/04 726/4 |
| 2005/0086298 | A1* | 4/2005 | Campbell | G06Q 40/00 709/203 |
| 2005/0097041 | A1* | 5/2005 | Campbell | G06Q 30/04 705/40 |
| 2005/0138110 | A1 | 6/2005 | Redlich et al. | |
| 2007/0208823 | A1 | 9/2007 | Shannon | |
| 2008/0294726 | A1 | 11/2008 | Sidman | |
| 2009/0060198 | A1* | 3/2009 | Little | G06Q 9/34 380/278 |
| 2009/0100262 | A1 | 4/2009 | Yoo | |
| 2010/0125734 | A1 | 5/2010 | Cho | |
| 2010/0161984 | A1* | 6/2010 | Pauker | H04L 63/0442 713/168 |
| 2012/0023158 | A1* | 1/2012 | Kashyap | H04L 63/0428 709/203 |
| 2012/0023571 | A1 | 1/2012 | Spies | |
| 2012/0159164 | A1* | 6/2012 | Brown | H04L 12/5895 713/168 |

OTHER PUBLICATIONS

Allard et al.; Secure personal data servers: a vision paper; Published in: Journal Proceedings of the VLDB Endowment VLDB Endowment Hompage archive; vol. 3 Issue 1-2, Sep. 2010; pp. 25-35; ACM Digital Library.*

Boneh et al, "Chosen Ciphertext Secure Public Key Threshold Encryption Without Random Oracles", Cryptology-CT-RSA 2006 (2006, Springer).

Kannamanani, R. "Software to provide security for Web Browser Cookies and Passwords using Trusted Computing Technology", Department Computer Science, Fraunhofer Institute for Security IT, Master's Thesis, Summer 2008.

Kohl, John T. et al., "The Evolution of the Kerberos Authentication Service", revision of paper presented at the Spring 1991 EurOpen Conference, Tromso, Norway, 1991.

Kretch, "A quick guide to getting started with PGP on Athena", www.mit.edu/afs/sipb/project/doc/pgp/pgp.html, Mar. 22, 2012.

Penango web page providing details of commercial product, www.penango.com, Mar. 22, 2012.

Callas, J. et al., "OpenPGP Message Format", RFC 4880, tools.ietf.org/html/rfc4880, IETF, Nov. 2007.

Ramsdell, B. et al., "Secure/Multipurpose Internet Mail Extensions (S/MIMME) Version 3.2 Message Specification", RFC 5751, IETF, tools.ietf.org/html/rfc5751, Jan. 2010.

TigerText for Mobile Security, commercial website, www.tigertext.com, Mar. 22, 2012.

Feisthammel, P., "PGP: Explanation of the web of trust of PGP", www.rubin.ch/pgp/weboftrust.en.html, Hauptseite Server—Hauptseite PGP-Key Signing Sessions, Feb. 2006.

Ranum, Marcus "Secure Communications over Open Networks (A Handbook for Paranoids)", USENIX—Tutorial Notes, Jan. 1, 1997, retrieved from the Internet: http://www.ranum.com/security/computer_security/archives/secure-communications.pdf.

Yahalom, Raphael, Birgit Klein, and Th Beth. "Trust relationships in secure systems—a distributed authentication perspective." Research in Security and Privacy, 1993. Proceedings., 1993 IEEE Computer Society Symposium on. IEEE, 1993.

Allard, Tristan, et al. "Secure personal data servers: a vision paper." Proceedings of the VLDB Endowment 3.1-2 (2010): 25-35.

* cited by examiner

METHOD AND SYSTEM FOR AUTOMATIC GENERATION OF CONTEXT-AWARE COVER MESSAGE

RELATED APPLICATION

This application is a continuation of U.S. application Ser. No. 13/906,039, entitled "METHOD AND SYSTEM FOR AUTOMATIC GENERATION OF CONTEXT-AWARE COVER MESSAGE," by inventors Shaun Murphy, Charles Murphy, and Richard Johnson, filed 30 May 2013, which claims the benefit of U.S. Provisional Patent application Ser. No. 61/655,434, entitled "COMMUNICATION SYSTEM USING AUTOMATED COVER MESSAGE GENERATION," by inventors Shaun Murphy, Charles Murphy, and Richard Johnson, filed 4 Jun. 2012.

The subject matter of this application is related to the subject matter in a co-pending non-provisional application by the same inventors as the instant application and filed on 18 Jun. 2014 entitled "CONFIDENTIAL MESSAGE EXCHANGE USING BENIGN, CONTEXT-AWARE COVER MESSAGE GENERATION," having Ser. No. 14/308,612, the disclosure of which is incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent fie or records, but otherwise reserves all copyright rights whatsoever.

BACKGROUND

1. Field

This disclosure is generally related to facilitating secure communication between two devices. More specifically, this disclosure is related to a method and system for automated cover message generation.

2. Related Art

The relentless growth of the Internet has brought with it an ever increase demand for applications that facilitate to conduct various types of transactions online. Secure communications, among other things, are becoming progressively important to service providers. Over the past few decades, a number of systems for delivering secure message over unsecured channels have been developed. For example, there exist a number of public key infrastructure (PKI) systems that can issue digital certificates which facilitate two communicating entities to encrypt their messages.

Simply encrypting messages, however, might not be sufficient. For example, even when messages (such as emails) are encrypted between two communicating entities, the cipher text is often transmitted over an open, unsecured channel, and the sending and receiving parties' identities are also known to the public. Such information can be used by a malicious user to decrypt the cipher text (for example, by using brute-force dictionary-based cracking methods).

In many situations it is desirable to obscure secure communications between a sender and a recipient with a cover message. Traditionally, the cover message has been manually generated, typically by the sender or on the sender's behalf. The cover message might be based on a template or form, with a customized salutation or address specific to the recipient. The manual process is time-consuming and may require personal knowledge by the sender of context relevant to the recipient for the cover message to appear personal. Other automated cover-message generation methods are often impersonal and the messages generated are easy to spot as form or bulk cover messages.

SUMMARY

One embodiment provides a system that facilitates secure communication between a sending device and a receiving device. During operation, the system receives, at the receiving device, a benign message sent over a communication channel from the sending device. Next, the system computes a digest from the benign message by hashing the benign message. The system then queries a cover message server with the computed digest to determine whether the benign message indicates that an encrypted message is available at a secure message server. Subsequently, the system obtains the encrypted message from the secure message server, responsive to determining that the benign message indicates that the encrypted message is available at the secure message server.

In some embodiments, the cover message is generated from a topic relevant to the sending device by the sending device.

In some embodiments, the benign message is generated from a topic relevant to the receiving device by the sending device.

In some embodiments, the system receives a list of topics and determines from the list one or more topics relevant to the receiving device based on contextual information collected on the receiving device.

In a further embodiment, the contextual information includes at least one of: an email; a calendar entry; a text message; web browsing history; a social network post; a blog entry, a picture, a video clip, a piece of text, a file, and a uniform resource locator (URL).

In a further embodiment, the system sends a list of topics relevant to the receiving device to a topic server, thereby allowing the topic server to determine a set of common topics relevant to both the sending device and the receiving device.

In a further embodiment, the benign message is generated by the sending device based on the common topics.

In some embodiments, the cover message server compares the digest of the benign message received from the receiving device with a digest received from the sending device to determine whether the digest computed from the benign message by the receiving device indicates that the benign message is a cover message indicating that the encrypted message is available at the secure message server.

BRIEF DESCRIPTION OF THE FIGURES

In the figures, like reference numerals refer to the same figure elements.

DETAILED DESCRIPTION

Figure 1:
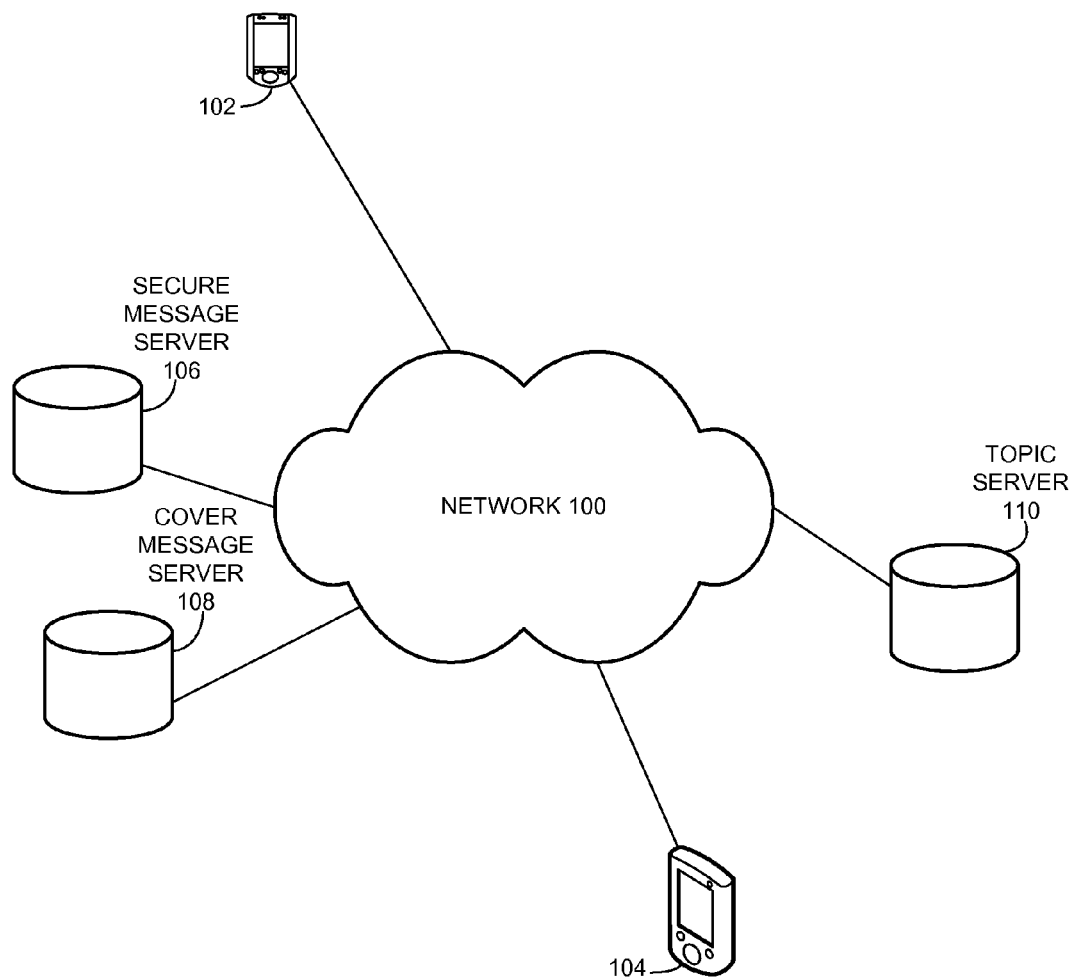
FIG. 1 illustrates an exemplary network architecture containing a system that facilitates automatic generation of context-aware cover messages for secure communication, in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In embodiments of the present invention, the problem of automatic generation of context-relevant cover messages to conceal encrypted, secure messages is solved by having a sending device automatically generating context-aware cover messages based on common context-relevant topics shared by both the sending device and receiving device. As mentioned above, one drawback of the existing cover message generation systems is that the cover messages are typically generated from a template or a form, and are often irrelevant to the users who need these cover messages to obscure their secure communication. In contrast, in embodiments of the present invention, a sending device can collect local contextual information, and obtain a list of topics that are relevant to such context and specific to the user using the device.

When the user wishes to send an encrypted, secure message to a receiving device, the sending device first sends the encrypted message to a secure message server. The sending device then automatically authors a cover messages based on a relevant common topic shared with the receiving device. Subsequently, the sending device computes a digest (e.g., a hash) of the cover message and sends this digest to a cover message server. The sending device then delivers this cover message to the receiving device. Upon receiving the cover message, the receiving device computes a digest and queries the cover message with the digest to determine whether the cover message indicates that an encrypted secure message is available at the secure message server. If so, the receiving device downloads the encrypted message from the secure message server and decrypts it with previously distributed keys.

Note that various embodiments can be implemented the above described process. More details are provided in the sections below. In this description, the term "secure message" refers to a message that carries confidential content from a sending device to a receiving device. Typically, the secure message is encrypted with the receiving device's public key, and can only be decrypted by the receiving device using its corresponding private key. Other encryption mechanisms are also possible. A secure message can be delivered via various means, such as email or text message.

The term "benign message" refers to a regular message that is typically delivered in plain text via a public unsecured channel. A "cover message" refers to a special type of benign message which indicates to a receiving device that a secure message is available to be downloaded. A cover message can provide a link, address, or other information permitting the receiving device to access the content. The receiving device can initiate a local application that retrieves the content and permits access thereto.

System Architecture and Operation

FIG. 1 illustrates an exemplary network architecture containing a system that facilitates automatic generation of context-aware cover messages for secure communication, in accordance with an embodiment. A pair of end-user devices, 102 and 104, are in communication via a network 100. Devices 102 and 104 can be any device that is capable of communicating over a wired and/or wireless network. For example, devices 102 and 104 can be smart phones, tablet PCs, regular computers, or any wired or wireless computing device. Network 100 can be a wireless network, the Internet, a cellular network, or a combination thereof.

Also coupled to network 100 are a secure message server 106, a cover message server 108, and a topic server 110. Secure message server 106 stores encrypted secure messages from any sending device, and allows a receiving device to download stored secure messages after successful authentication.

Cover message server 108 stores digests for cover messages generated by any sending device. By storing these cover message digests, cover message server 108 can confirm whether a benign message received by a receiving device is in fact a cover message. In one embodiment, a receiving device can send a benign message digest to cover message server 108, which in turn compares the received digest with its stored digests to determine whether the benign message is a cover message or just a regular benign message.

Topic server 110 is responsible for collecting topics from any device in the network. In one embodiment, topic server 110 can distribute to the devices a generic topic list. Such a list might be based on, for example, the current popular topics in the news, sports, entertainment industry, etc. A respective device may download this generic list. In addition, the device might perform some kind of data mining on the user's local contextual data, such as the user's emails, calendar entries, chat history, text message history, web browsing history, etc., to determine whether a topic in the generic topic list is relevant to the user. In addition, the device can send a relevant topic list, which contains all the pertinent topics based on the user's contextual information, to topic server 110. In turn, topic server 110 stores each user's relevant topics. In one embodiment, a respective relevant topic list is indexed by the corresponding user's identifier. Such an identifier can be a phone number, email address or a social network media ID.

Note that, although in the example illustrated in FIG. 1 secure message server 106, cover message server 108, and topic server 110 are separate systems (which might or might not be located in different locations), these servers can also reside in a common hardware system or datacenter. In one embodiment, the functions of these three servers can be carried out by a common physical server.

Figure 2:
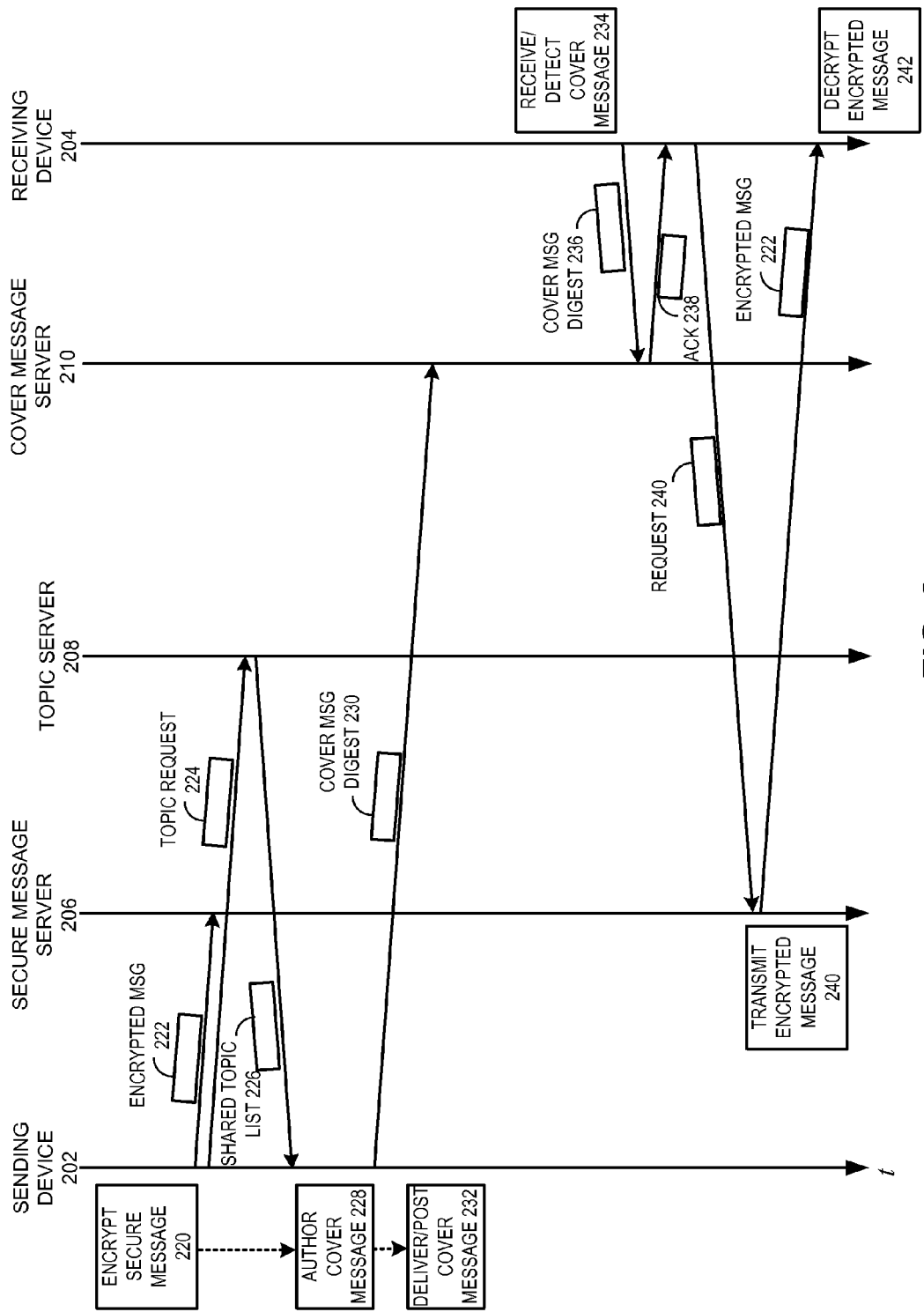
FIG. 2 presents a time-space diagram illustrating an exemplary process of automatic generation of context-aware cover messages, in accordance with an embodiment.

FIG. 2 presents a time-space diagram illustrating an exemplary process of automatic generation of context-aware cover messages, in accordance with an embodiment. In this example, assume that a sending device 202 needs to send a secure message to a receiving device 204, and that a public/private key pair has already been distributed between sending device 202 and receiving device 204. During operation, sending device 202 first encrypts the secure message with receiving device 204's public key (operation 220). Sending device 202 then sends the encrypted message 222 to a secure message server 206. At approximately the same time, sending device 202 sends a topic request 224 to a topic server 208. The purpose of sending topic request 224 is to obtain a list of common topics shared between sending device 202 and receiving device 204. In one embodiment, topic request 224 includes an identifier for sending device 202 and an identifier for receiving device 204.

In response topic request 224, topic server 208 sends a shared topic list 226 to sending device 202. Note that shared topic list 226 can include any topic that is relevant to the respective users of sending device 202 and receiving device 204. For example, shared topic list 226 might include latest news of a local sports team, a recently released film, popular news topics, popular music, etc.

After receiving shared topic list 226, sending device 202 authors a cover message (operation 228). To author the cover message, sending device 202 can select one topic from topic list 226, and automatically generate a piece of content based on the selected topic. Various methods can be used to generate the content, which can be a combination of text, pictures, and other medium form. In one embodiment, sending device can issue a search to the Internet with the selected topic as a search key word, and crawl the search results to generate the content.

Subsequently, sending device 202 generates a cover message digest 230 by hashing the cover message. Other methods can also be used to produce cover message digest 230. Sending device 202 then sends cover message digest 230 to cover message server 210, which in turn stores cover message digest 230. Furthermore, sending device 202 delivers or posts the cover message (operation 232). Note that the cover message can be delivered to receiving device 204 in various ways. For example, the cover message can be sent as an SMS message, an email, a blog post, a social network media entry (such as a TWITTER or FACEBOOK entry). In one embodiment, the user of sending device 202 can set a preference for the delivery of the cover message.

In response, receiving device 204 receives or detects the cover message (operation 234). In one embodiment, receiving device 204 is pre-configured to monitor certain communication channel(s), such as SMS messages, incoming emails, a certain blog, or a certain social network media channel. Once the cover message is received, receiving device 204 computes a hash for the cover message to produce cover message digest 236. Next, receiving device 204 sends cover message digest 236 to cover message server 210, which searches its storage to determine whether cover message digest 236 matches with any previously stored digest. Cover message server 210 then sends an acknowledgement 238 back to receiving device 204 to confirm whether cover message digest 236 indicates that receiving device 204 has in fact received a real cover message, instead of a regular benign message.

After confirming that the cover message indicates the availability of a secure message for receiving device 204, receiving device 204 subsequently sends a request 240 to secure message server 206 to request encrypted message 222. Note that receiving device 204 might be required to authenticate itself with necessary security credentials (such as a password or a digital certificate). In addition, request 240 can include receiving device 204's identifier, which secure message server 206 uses to locate encrypted message 222. In response to request 240, secure message server 206 transmits encrypted message 222 to receiving device 204 (operation 240). Receiving device 204 then decrypts encrypted message 222 using its private key (operation 242).

Figure 3:
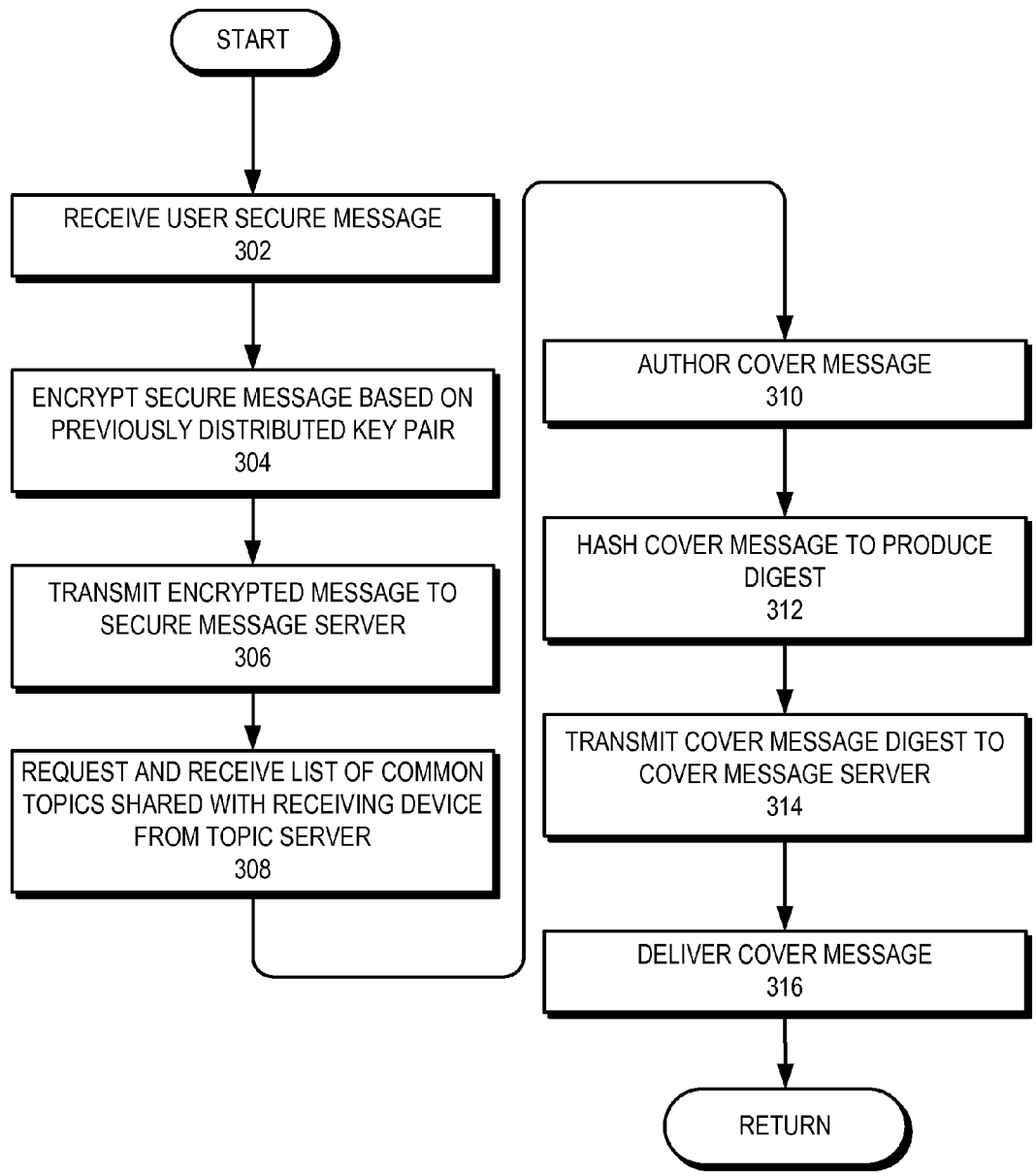
FIG. 3 presents a flowchart illustrating an exemplary process of a sending device automatically generating a context-aware cover message, in accordance with an embodiment.

FIG. 3 presents a flowchart illustrating an exemplary process of a sending device automatically generating a context-aware cover message, in accordance with an embodiment. During operation, the sending device receives a secure message from the user (operation 302). The sending device then encrypts the secure message based on a previously distributed key pair (e.g., the receiving device's public key) (operation 304). Next, the sending device transmits the encrypted message to the secure message serve (operation 306).

Subsequently, the sending device requests and receives a list of common topics shared with the receiving device from the topic server (operation 308). The sending device then authors a cover message based on one or more topics shared with the receiving device (operation 310). The sending device further hashes the cover message to produce a digest (operation 312), and transmits the cover message digest to the cover message server (operation 314). The system can use various hashing methods, such as SHA-512. Next, the sending device delivers the cover message (operation 316). In some embodiments, the cover message can be delivered by a third party, instead of by the sending device.

According an aspect of the present disclosure, one or more of a variety of seeds may be used to generate the cover message. For example, the city in which the recipient resides may be used to generate a message about current weather, such as "Sorry to hear about the cold weather in New York this week," about sports, such as "Tough loss for the Rangers last night," about local news, such as "Let me know if I can help with a contribution to the school that was vandalized" and so on. The seed may be one or more of the following: a physical location of the recipient, a recent communication from or to the recipient, or data from a personal profile of the recipient, such as personal interests, travel, family status, and so on. The server may also obtain data for content of the cover message from many other geographically and/or temporally disparate sources, prior similar messages, and other sources so as to provide what otherwise appears as a contextually appropriate but benign natural language message. Multiple language support may also be provided. (Any personal information obtained and used in such a system may be subject to appropriate and prudent permissions and security.) The cover message may also be password protected, such as using the safe key, for an appearance of security, to be consistent with the system in which the messaging takes place, and so on.

According to a further aspect of the present disclosure, processes and systems are disclosed for automatically learning and utilizing elements of communication between a sender and a recipient, including: automatically learning and utilizing the best fit language (including colloquialisms,) grammar, and typing style of the communicating parties based on communication history; automatically learning and utilizing the best fit common interests and location topics for the communicating parties based on communication history; automatically learning and utilizing the best fit common data sources such as online blogs and news sources based on browsing and application use history; and automatically learning and utilizing behavior sending and replying mechanics including the time of day/week/month/year a message should be sent and what transport is most appropriate for the parties. Still further, processes and systems are disclosed enabling generatively creating unique conversation threads that have persistent themes and topics over time.

Figure 4:
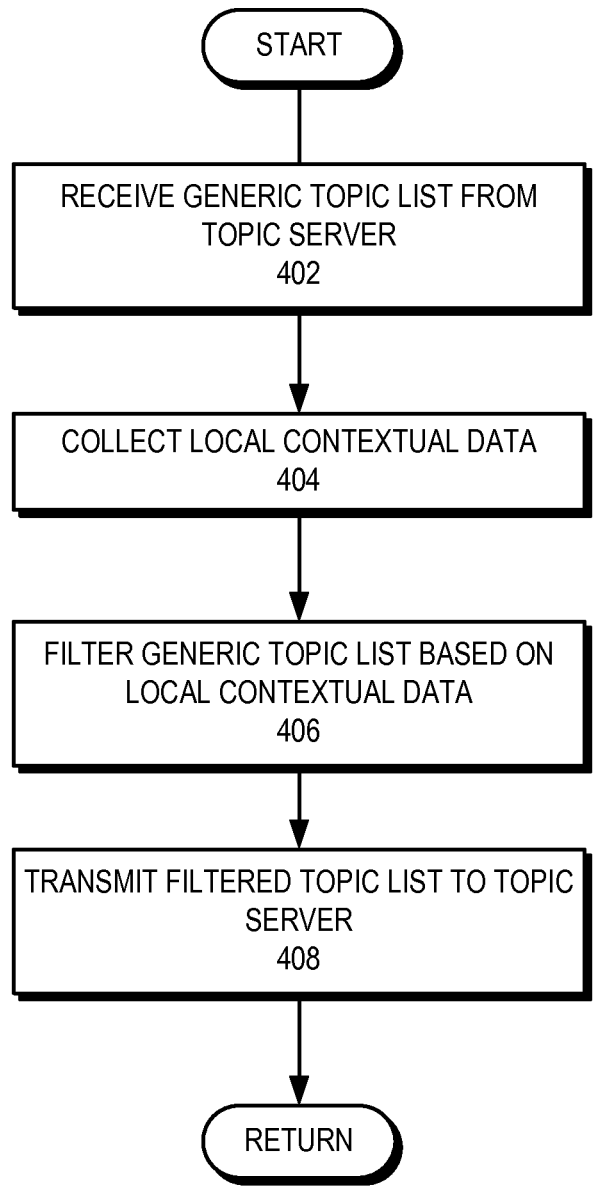
FIG. 4 presents a flowchart illustrating an exemplary process of a device uploading to a topic server a list of topics relevant to local context, in accordance with an embodiment.

FIG. 4 presents a flowchart illustrating an exemplary process of a device uploading to a topic server a list of topics relevant to local context, in accordance with an embodiment. In general, a sending or receiving device first receives a generic topic list from the topic server (operation 402). Note that the topic server can regularly search the Internet to compile the generic topic list. The device then collects local contextual data (operation 404). For example, the device can scan the local user's emails, SMS messages, chat history, blog entries, social media content history, web browsing history, etc. Next, the device can filter the generic topic list based on the local contextual data (operation 406). The device subsequently transmits the filtered topic list back to the topic server (operation 408).

Figure 5:
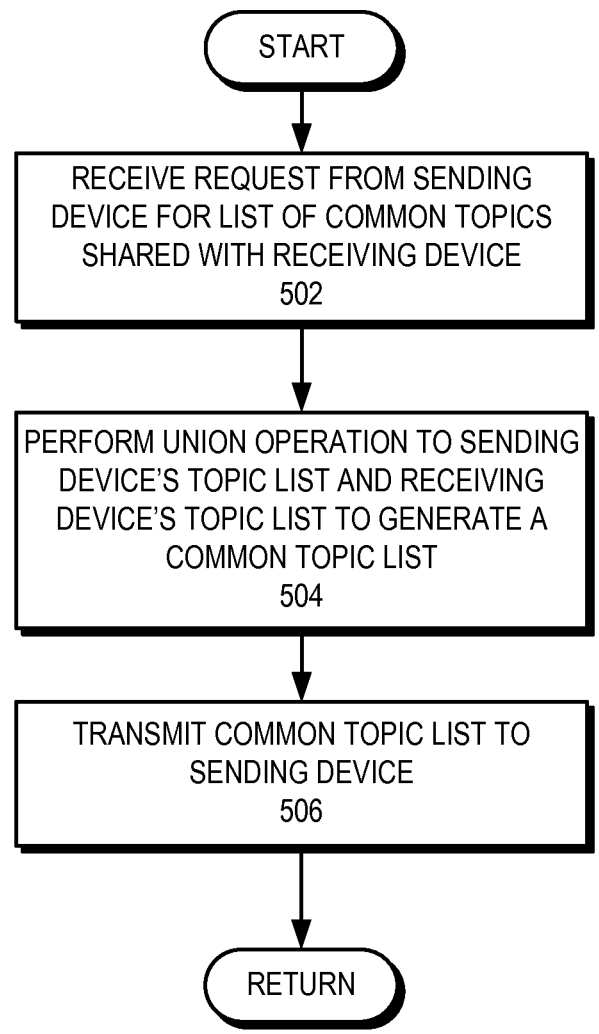
FIG. 5 presents a flowchart illustrating an exemplary process of a topic server processing a request from a sending device for a list of common topics shared between the sending device and a receiving device, in accordance with an embodiment.

FIG. 5 presents a flowchart illustrating an exemplary process of a topic server processing a request from a sending device for a list of common topics shared between the sending device and a receiving device, in accordance with an embodiment. During operation, the topic server receives a request from a sending device for a list of common topics shared between the sending device and the receiving device (operation 502). It is assumed that at this point in time, the topic server has already received the filtered topic lists from both the sending device and receiving device. The topic server then performs a union operation to the sending device's topic list and receiving device's topic list to generate a common topic list (operation 504). The topic server then transmits the common topic list to the sending device (operation 506).

Figure 6:
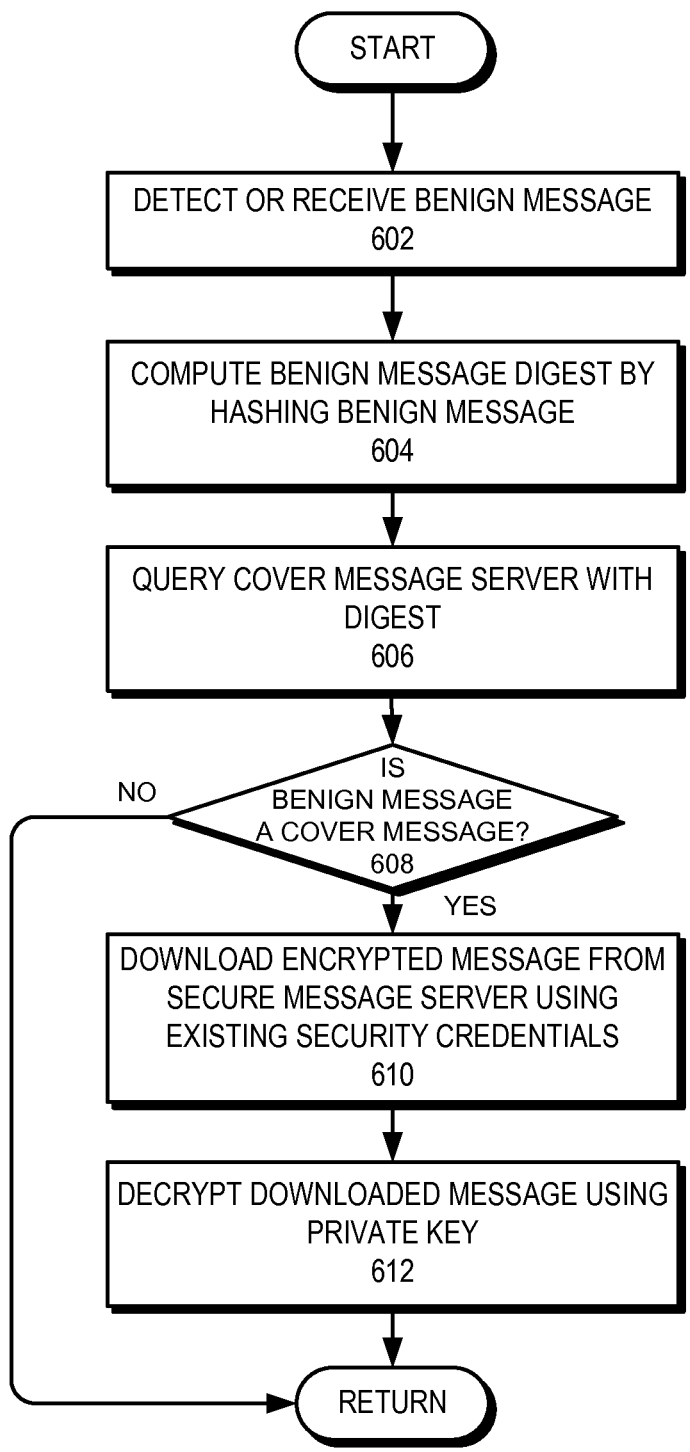
FIG. 6 presents a flowchart illustrating an exemplary process of a receiving device receiving a cover message and subsequently obtaining a corresponding secure message, in accordance with an embodiment.

FIG. 6 presents a flowchart illustrating an exemplary process of a receiving device receiving a cover message and subsequently obtaining a corresponding secure message, in accordance with an embodiment. During operation, the receiving device first detects or receives a benign message by monitoring one or more communication channels (operation 602). The receiving device then computes a benign message digest by hashing the received benign message (operation 604). Note that some hashing methods (such as the SHA-512 hashing method) can be computationally expensive on a general purpose processor. In some embodiments, a dedicated, special-purpose piece of hardware (such as an application-specific integrated circuit (ASIC) or field programmable logic array (FPGA)) is used to perform the hashing function. The receiving device then queries the cover message server with the computed digest (operation 606). Based on the response from the cover message server, the receiving device determines whether the benign message is a cover message (operation 608). If the benign message is not a cover message, the receiving device does not perform any special operation. If the benign message is a cover message, the receiving device then downloads the encrypted message from the secure message server using its existing security credentials (operation 610). The receiving device then decrypts the downloaded message using its private key (operation 612).

Figure 7:
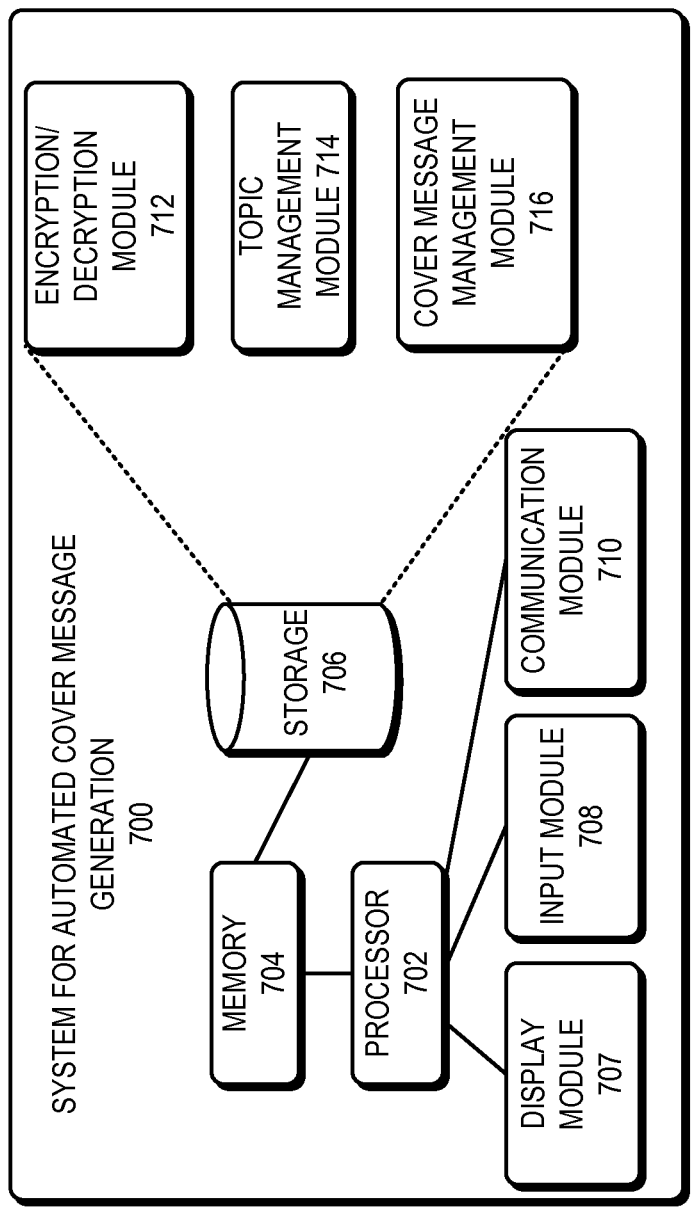
FIG. 7 illustrates an exemplary computer system that facilitates automatic generation of context-aware cover messages for secure communication, in accordance with an embodiment.

FIG. 7 illustrates an exemplary computer system that facilitates automatic generation of context-aware cover messages for secure communication, in accordance with an embodiment. In this example, a system 700 for automated cover message generation includes a memory device 704, a processor 702, a storage device 706, a display module 707, an input module 708, and a communication module 710.

Storage device 706 stores instructions which when loaded into memory 704 and executed by processor 702 cause processor 702 to perform the aforementioned operations (for a sending device, a receiving device, or both). More specifically, the instructions stored in storage device 706 include an encryption/decryption module 712, a topic management module 714, and a cover message management module 716. Encryption/decryption module 712 is responsible for encrypting and decrypting a secure message. Topic management module 714 is responsible for uploading locally filtered topic list to the topic server, and receiving a shared topic list with respect to a particular receiving device from the topic server. Cover message management module 716 is responsible for generating a context-aware cover message and computing a digest for a generated or received cover message.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer executed method for facilitating secure communication between a sending device and a receiving device, comprising:
  receiving, at the receiving device, a benign message sent over a communication channel from the sending device, wherein the benign message is generated from a topic relevant to a user of the receiving device by the sending device;
  computing a digest from the benign message by hashing the benign message;
  querying a cover message server with the computed digest to determine whether the benign message indicates that an encrypted message is available at a secure message server, wherein the cover message server compares the computed digest of the benign message received from the receiving device with a digest received from the sending device to determine whether the digest computed from the benign message by the receiving device indicates that the benign message is a cover message indicating that the encrypted message is available at the secure message server; and obtaining the encrypted message from the secure message server, in response to determining that the benign message indicates that the encrypted message is available at the secure message server.

2. The method of claim 1, wherein the benign message is generated from a topic also relevant to a user of the sending device by the sending device.

3. The method of claim 1, further comprising receiving a list of topics and determining from the list one or more topics relevant to the user of the receiving device based on contextual information collected on the receiving device.

4. The method of claim 3, wherein the contextual information includes at least one of:
an email;
a calendar entry;
a text message;
web browsing history;
a social network post;
a blog entry;
a picture;
a video clip;
a piece of text;
a file; and
an URL.

5. The method of claim 3, further comprising sending a list of topics relevant to the user of the receiving device to a topic server, thereby allowing the topic server to determine a set of common topics relevant to both a user of the sending device and the user of the receiving device.

6. The method of claim 5, wherein the benign message is generated by the sending device based on the common topics.

7. A non-transitory storage medium storing instructions which when computer executed by a processor cause the processor to perform a method for facilitating secure communication between a sending device and a receiving device, the method comprising:
receiving, at the receiving device, a benign message sent over a communication channel from the sending device, wherein the benign message is generated from a topic relevant to a user of the receiving device by the sending device;
computing a digest from the benign message by hashing the benign message;
querying a cover message server with the computed digest to determine whether the benign message indicates that an encrypted message is available at a secure message server, wherein the cover message server compares the computed digest of the benign message received from the receiving device with a digest received from the sending device to determine whether the digest computed from the benign message by the receiving device indicates that the benign message is a cover message indicating that the encrypted message is available at the secure message server; and
obtaining the encrypted message from the secure message server, in response to determining that the benign message indicates that the encrypted message is available at the secure message server.

8. The storage medium of claim 7, wherein the benign message is generated from a topic also relevant to a user of the sending device by the sending device.

9. The storage medium of claim 7, further comprising receiving a list of topics and determining from the list one or more topics relevant to the user of the receiving device based on contextual information collected on the receiving device.

10. The storage medium of claim 9, wherein the contextual information includes at least one of:
an email;
a calendar entry;
a text message;
web browsing history;
a social network post;
a blog entry;
a picture;
a video clip;
a piece of text;
a file; and
an URL.

11. The storage medium of claim 9, further comprising sending a list of topics relevant to the user of the receiving device to a topic server, thereby allowing the topic server to determine a set of common topics relevant to both a user of the sending device and the user of the receiving device.

12. The storage medium of claim 11, wherein the benign message is generated by the sending device based on the common topics.

13. A computing system for facilitating secure communication between a sending device and a receiving device, comprising:
a computer processor; and
a storage device coupled to the processor and storing instructions which when executed by the processor configures the processor to:
receive, at the receiving device, a benign message sent over a communication channel from the sending device, wherein the benign message is generated from a topic relevant to a user of the receiving device by the sending device;
compute a digest from the benign message by hashing the benign message;
query a cover message server with the computed digest to determine whether the benign message indicates that an encrypted message is available at a secure message server, wherein the cover message server compares the computed digest of the benign message received from the receiving device with a digest received from the sending device to determine whether the digest computed from the benign message by the receiving device indicates that the benign message is a cover message indicating that the encrypted message is available at the secure message server; and
obtain the encrypted message from the secure message server, in response to determining that the benign message indicates that the encrypted message is available at the secure message server.

14. The computing system of claim 13, wherein the benign message is generated from a topic also relevant to a user of the sending device by the sending device.

15. The computing system of claim 13, wherein the processor is further configured to receive a list of topics and determine from the list one or more topics relevant to the user of the receiving device based on contextual information collected on the receiving device.

16. The computing system of claim 15, wherein the contextual information includes at least one of:
an email;
a calendar entry;
a text message;
web browsing history;
a social network post;
a blog entry;
a picture;
a video clip;
a piece of text;

a file; and an URL.

17. The computing system of claim 15, wherein the processor is further configured to send a list of topics relevant to the user of the receiving device to a topic server, thereby allowing the topic server to determine a set of common topics relevant to both a user of the sending device and the user of the receiving device.

18. The computing system of claim 17, wherein the benign message is generated by the sending device based on the common topics.

* * * * *